United States Patent
Zeller et al.

(10) Patent No.: US 11,987,746 B2
(45) Date of Patent: May 21, 2024

(54) IONIC LIQUID CORROSION INHIBITORS

(71) Applicant: Halliburton Energy Services, Inc., Houston, TX (US)

(72) Inventors: Robert August Zeller, Houston, TX (US); Philippe Prince, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 202 days.

(21) Appl. No.: 17/615,997

(22) PCT Filed: Jul. 2, 2019

(86) PCT No.: PCT/US2019/040232
§ 371 (c)(1),
(2) Date: Dec. 2, 2021

(87) PCT Pub. No.: WO2021/002848
PCT Pub. Date: Jan. 7, 2021

(65) Prior Publication Data
US 2022/0243118 A1 Aug. 4, 2022

(51) Int. Cl.
C09K 8/54 (2006.01)
C23F 11/16 (2006.01)
E21B 41/02 (2006.01)

(52) U.S. Cl.
CPC .............. C09K 8/54 (2013.01); C23F 11/163 (2013.01); E21B 41/02 (2013.01); C09K 2208/32 (2013.01)

(58) Field of Classification Search
CPC ....... E21B 41/02; C09K 8/54; C09K 2208/32; C23F 11/163
See application file for complete search history.

(56) References Cited

U.S. PATENT DOCUMENTS

| | | | | |
|---|---|---|---|---|
| 6,350,721 B1 * | 2/2002 | Fu | ............... | C09K 8/72 507/237 |
| 6,924,253 B2 * | 8/2005 | Palmer | ................... | C09K 8/528 507/927 |
| 9,695,370 B2 * | 7/2017 | Anderson | ............... | C10G 7/10 |
| 2008/0251759 A1 * | 10/2008 | Kalb | ................... | C07C 381/12 252/183.13 |

(Continued)

FOREIGN PATENT DOCUMENTS

| CN | 101736345 B | 6/2010 |
|---|---|---|
| CN | 103046055 A | 4/2013 |

(Continued)

OTHER PUBLICATIONS

Taghavikish, Mona, Naba Kumar Dutta, and Namita Roy Choudhury. "Emerging corrosion inhibitors for interfacial coating." Coatings 7.12 (2017): 217.

(Continued)

*Primary Examiner* — Angela M DiTrani Leff
(74) *Attorney, Agent, or Firm* — Thomas Rooney; C. Tumey Law Group PLLC

(57) ABSTRACT

Methods for providing corrosion inhibition in conduits, containers, and wellbores penetrating subterranean formations are provided. In some embodiments, the methods include contacting a metal surface with a fluid that includes a corrosion inhibitor additive, in certain embodiments, the corrosion inhibitor additive includes an tonic liquid.

17 Claims, 3 Drawing Sheets

(56) References Cited

U.S. PATENT DOCUMENTS

| | | | | |
|---|---|---|---|---|
| 2012/0121485 A1* | 5/2012 | Rogers | ............... | C10G 25/003 |
| | | | | 548/402 |
| 2013/0142977 A1 | 6/2013 | Setlur et al. | | |
| 2015/0090369 A1* | 4/2015 | Qu | .................. | C23C 22/48 |
| | | | | 148/253 |
| 2016/0215198 A1* | 7/2016 | Qu | .................. | C09K 8/40 |
| 2020/0318243 A1* | 10/2020 | Obot | .................. | C23F 11/149 |
| 2022/0098484 A1* | 3/2022 | Park | .................. | C09K 11/54 |

FOREIGN PATENT DOCUMENTS

| CN | 103555313 B | 1/2016 |
|---|---|---|
| CN | 107434785 A | 12/2017 |
| JP | 4611567 B2 | 1/2011 |
| WO | 2013/076509 A1 | 5/2013 |
| WO | 2016/032578 A1 | 3/2016 |

OTHER PUBLICATIONS

Zhang, Q. B., and Y. X. Hua. "Corrosion inhibition of mild steel by alkylimidazolium ionic liquids in hydrochloric acid." Electrochimica Acta 54.6 (2009): 1881-1887.

Ma, Ying, et al. "Acidic-functionalized ionic liquid as corrosion inhibitor for 304 stainless steel in aqueous sulfuric acid." ACS Sustainable Chemistry & Engineering 4.9 (2016): 5046-5052.

Espinosa, Tulia, et al. "Surface interactions, corrosion processes and lubricating performance of protic and aprotic ionic liquids with OFHC copper." Applied Surface Science 273 (2013): 578-597.

International Search Report and Written Opinion issued in related PCT Application No. PCT/US2019/040232 mailed Apr. 2, 2020, 10 pages.

* cited by examiner

IONIC LIQUID CORROSION INHIBITORS

CROSS-REFERENCE TO RELATED APPLICATION

The present application is a U.S. National Stage Application of International Application No. PCT/US2019/040232 filed Jul. 2, 2019, which is incorporated herein by reference in its entirety for all purposes.

BACKGROUND

The present disclosure relates to compositions, treatment fluids, and methods for providing corrosion inhibition in subterranean operations, pipelines, and other related operations. The corrosion of metal surfaces occurs when metal surfaces are contacted by a corrosive environment containing an oxidizer (e.g., an electrochemical oxidizer, a chemical oxidizer or the like). Illustrative corrosive environments include, for example, acidic environments, environments containing water vapor in the presence of air and/or oxygen, and environments containing chloride or bromide ions, carbon dioxide and/or hydrogen sulfide. As used herein, the term "corrosion" refers to any interaction between a material and its environment that causes some deterioration of the material or its properties. Examples of common types of corrosion include, but are not limited to, the rusting of a metal, the dissolution of aa metal in acids, and patina development on the surface of a metal.

In subterranean applications, metal surfaces on various types of equipment are often exposed to corrosive conditions during downhole operations. For example, corrosive components including brine, carbon dioxide, and/or hydrogen sulfide are commonly encountered downhole, Pipelines and conduits used to transport fluids between various locations (in the oilfield industry and elsewhere) also may be exposed to fluids that can cause corrosion. Corrosive environments can be produced by treatment fluids that are commonly used in a number of operations in the oil and chemical industries. In such operations, any metal surfaces present (e.g., piping, tubular goods, heat exchangers and reactors) are subjected to the corrosive environment of the treatment fluid.

To combat potential corrosion problems, certain corrosion inhibitors additives have been used to reduce, inhibit, and/or substantially prevent corrosion of metal and metal alloy surfaces on downhole equipment, all with varying levels of success. As used herein, the term "inhibit" and its derivatives refer to a lessening of the tendency of a phenomenon to occur and/or the degree to which that phenomenon occurs. The term "inhibit" does not imply any particular degree or amount of inhibition.

BRIEF DESCRIPTION OF THE DRAWINGS

These drawings illustrate certain aspects of some of the embodiments of the present disclosure and should not be used to limit or define the claims.

Figure 1:
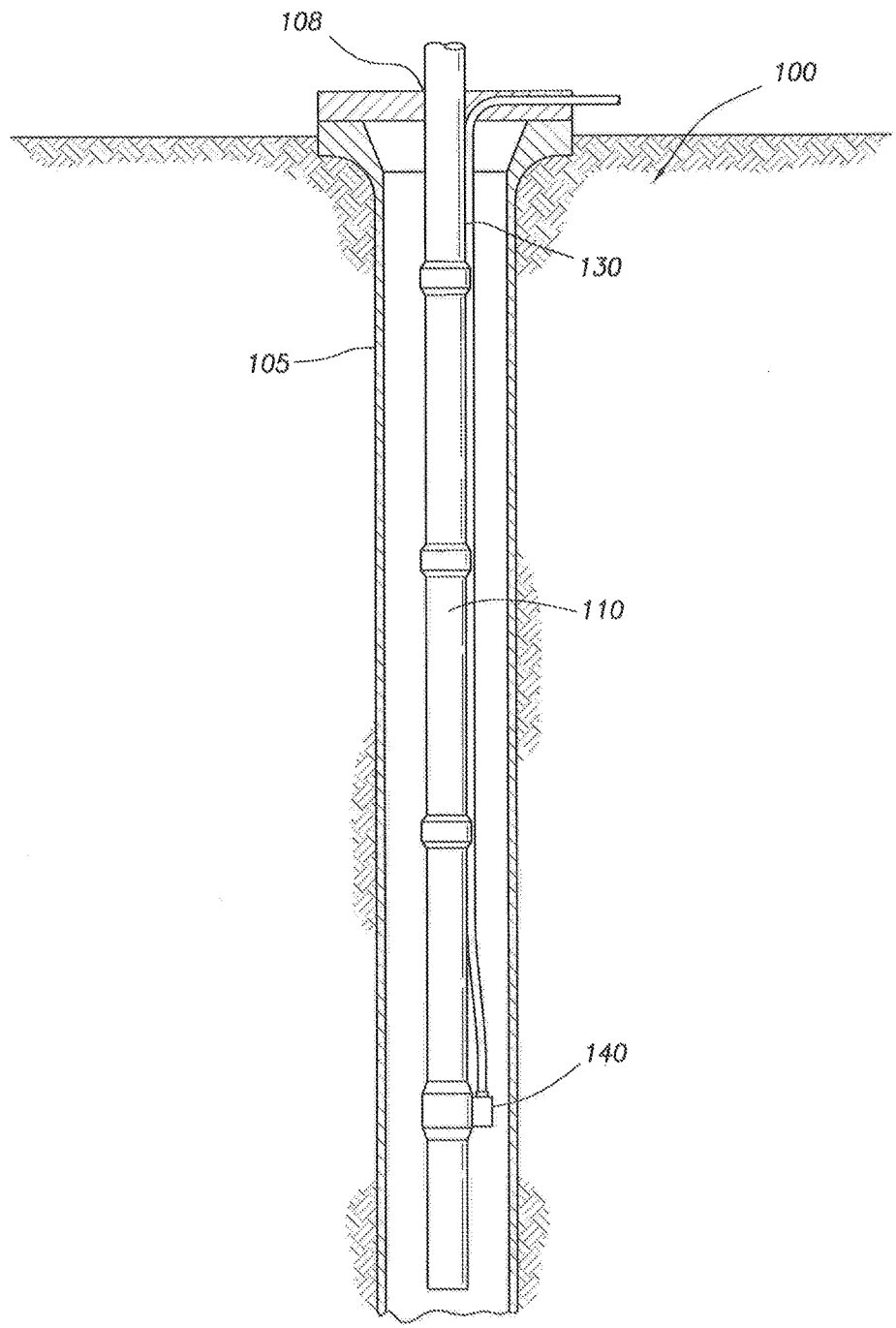
FIG. 1 is a diagram illustrating an injection system used in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in thrill and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

Illustrative embodiments of the present disclosure are described in detail herein. In the interest of clarity, not all features of an actual implementation may be described in this specification. It will of course be appreciated that in the development of any such actual embodiment, numerous implementation specific decisions may be made to achieve the specific implementation goals, which may vary from one implementation to another. Moreover, it will be appreciated that such a development effort might be complex and time-consuming but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the invention. Embodiments of the present disclosure involving wellbores may be applicable to horizontal, vertical, deviated, or otherwise nonlinear wellbores in any type of subterranean formation. Embodiments may be applicable to injection wells, monitoring wells, and production wells, including hydrocarbon or geothermal wells.

As used herein, the nomenclature "$C_x$ to $C_y$" refers to the number of carbon atoms in a hydrocarbyl group (here, ranging from x to y carbon atoms), wherein x and y may be any positive integer. As used herein, a "hydrocarbyl group" may, unless otherwise specifically noted, be branched, unbranched, non-cyclic, and/or cyclic; substituted or unsubstituted (that is, it may or may not contain one or more additional moieties or functional groups in place of one or more hydrogen atoms in the hydrocarbon chain); saturated or unsaturated; and/or may include one or more heteroatoms e.g., O, N, P, S). As used herein, "independently" refers to the notion that preceding items play be the same as or different from each other.

The present disclosure relates to methods, systems, and compositions for providing corrosion inhibition in wellbores penetrating subterranean formations or conduits, such as pipes used for the production and/or transport of petroleum products, natural gas, and the like. In certain embodiments, the present disclosure may provide corrosion inhibitor additives that include an ionic liquid. In some embodiments the ionic liquid may include an organic cation and an organic anion. In some embodiments, the corrosion inhibitor additives may be provided, used, and/or introduced as an ionic liquid. The methods of the present disclosure may include contacting a metal surface with a fluid that includes a corrosion inhibitor additive, wherein the corrosion inhibitor additive includes an ionic liquid. In certain embodiments, a fluid including the corrosion inhibitor additive may be introduced into at least a portion of a conduit or container that includes a metal surface. In certain embodiments, the corrosion inhibitor additive may be introduced into a wellbore penetrating at least a portion of a subterranean formation. Among the many advantages to the corrosion inhibitor additives, such additives may, among other benefits, provide corrosion inhibition without the use of volatile compounds. In some embodiments, the corrosion inhibitor additives provide corrosion inhibition without the use of volatile solvents. In some embodiments, both the organic cation and organic anion of the corrosion inhibitor additives are selected to provide corrosion inhibition.

In certain embodiments, the present disclosure further provides methods of using such corrosion inhibitor additives to inhibit and/or reduce corrosion in corrosive environments. For example, the corrosion inhibitor additives may inhibit and/or reduce corrosion in acidic environments, environments containing water vapor in the presence of air and/or oxygen, and environments containing chloride or bromide ions, carbon dioxide, and/or hydrogen sulfide. In certain embodiments, the corrosion inhibitor additives may inhibit corrosion of various types of metals, including, but not limited to a ferrous alloy, carbon steel, copper, aluminum, any derivative thereof and any combination thereof.

In some embodiments, the corrosion inhibitor additives may be film-forming corrosion inhibitors. The corrosion inhibitor additives and/or their salts may include surface-active compounds that may form a protective film on the surface of a metal, thereby suppressing corrosion. The effectiveness of such a film-forming corrosion inhibitor (FFCI) may be based, at least in part, on the strength of the FFCI's adsorption or other adherence to the metal surface (or to another surface such as a ferrous scale surface like siderite, iron carbonate). In certain embodiments, the effectiveness of the corrosion inhibitor additives of the present disclosure may increase with the strength of adsorption. The corrosion inhibitor additives may, in some embodiments, form a protective layer that physically, chemically, or otherwise hinders or prevents corrosive compounds from reaching the metal or other surface to which the inhibitor has adhered. In some embodiments, any such protective film or layer may be removed. For example, the protective film or layer may be removed intentionally (e.g., by an additive or fluid) or simply by the passage of time.

In certain embodiments, the corrosion inhibitor additives may include an ionic liquid. In such embodiments, the ionic liquid may include one or more organic anions and one or more organic cations. Organic anions suitable for one or more embodiments of the present disclosure may include, but are not limited to a sulfonate anion, a carboxylate anion, a phosphonate anion, a thiolate anion, and any combination thereof. Organic cations suitable for one or more embodiments of the present disclosure may include, but are not limited to an ammonium cation, an imidazolium cation, a pyrrolidinium cation, a morpholinium cation, a pyridinium cation, a pyrazolium cation, a triazolium cation, a sulfonium cation, a phosphonium cation, and any combination thereof. It will be appreciated by one of ordinary skill in the art having the benefit of this disclosure that ionic liquids may be formed with other organic anions and organic cations instead of or in addition to the organic anions and organic cations specifically disclosed herein.

In certain embodiments, each organic anion may include one or more anionic moieties and each organic cation may include one or more cationic moieties. In certain embodiments, the ionic liquid may have a stoichiometric ratio of anionic moieties to cationic moieties of 1:1 or more. For example, the ionic liquid may include 1:2 stoichiometric ratio of anionic moieties to cationic moieties. For example, the following FIG. 1 illustrates an anionic liquid with a stoichiometric ratio of anionic moieties to cationic moieties of 1:2. The organic anion includes two anionic moieties, a carboxylate anionic moiety and a phosphonate anionic moiety and the organic cation includes one anionic moiety, an ammonium cationic moiety.

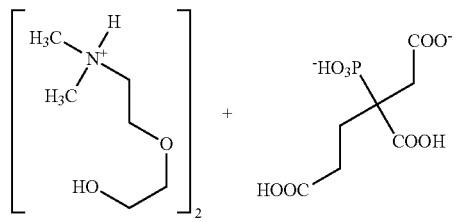

(I)

In certain embodiments, each anionic moiety and cationic moiety may independently include one or more R-groups: R, $R_1$, $R_2$, $R_3$, and $R_4$, as illustrated in FIG. 11 shown below. Each of R, $R_1$, $R_2$, $R_3$, and $R_4$ may independently include either a hydrogen atom or one or more hydrocarbon chains of any length, branched or unbranded, and/or saturated or unsaturated (so long as the anionic moiety and cationic moiety maintain their anionic and cationic changes, respectively). In some embodiments, each of R, $R_1$, $R_2$, $R_3$, and $R_4$ may include a $C_1$ to $C_{20}$ hydrocarbon chain or longer. In certain embodiments, an anionic moiety of the organic anion may be bonded via the $C_1$ to $C_{20}$ hydrocarbon chain to one or more additional anionic moieties. In certain embodiments, a cationic moiety of the organic cation may be bonded via the $C_1$ to $C_{20}$ hydrocarbon chain to one or more additional cationic moieties.

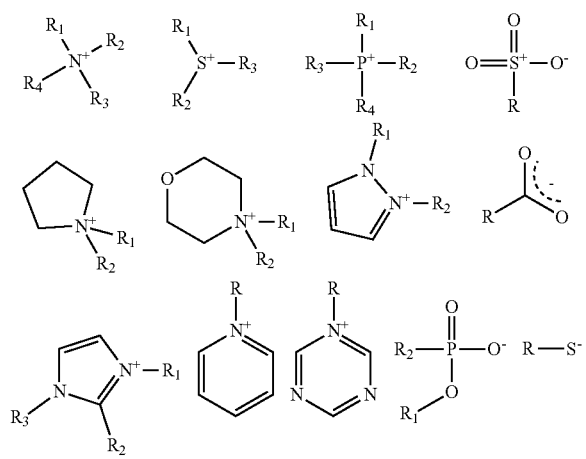

(II)

In embodiments wherein at least one of R, $R_1$, $R_2$, $R_3$, and $R_4$ includes a $C_1$ to $C_{20}$ hydrocarbon chain, the hydrocarbon chain may include any one or more, hydrocarbon groups selected from the group consisting of alkenyl, alkynyl, aryl, arylalkyl, arylalkenyl, alkylaryl, alkenylaryl, and any combination thereof, for example. In certain embodiments, each of, $R_1$, $R_2$, $R_3$, and $R_4$ may independently include (i) as few as any one of 1, 2, 3, 4, 5, 6, 7, 8, 9, 10, 11, 12, 13, 14, 15, 16, 17, 18, and 19 carbon atoms, and (ii) as many as one of 2, 3, 4, 5, 6, 7 8, 9, 10, 11, 12, 13, 14, 15, 16, 17, 18, 19, and 20 carbon atoms. For example, suitable nines of carbon atoms in each of R, $R_1$, $R_2$, $R_3$, and $R_4$ according to various embodiments include, but are not limited to 1 to 5, 3 to 5, 4 to 8, 4 to. 15, 8 to 18, 1'2 to 16, 8 to 20, 10 to 20, 15 to 20, and the like. In certain embodiments, suitable ranges of carbon atoms in each of R, $R_1$, $R_2$, $R_3$, and $R_4$ include 5 to 15 carbon atoms. In another embodiment, suitable ranges of carbon atoms in each of R, $R_1$, $R_2$, $R_3$, and $R_4$ include 7 to 13 carbon atoms, in certain embodiments, any one or more of R, $R_1$, $R_2$, $R_3$, and $R_4$ may be substituted such that it includes any kind and any number of functional groups in addition to the hydrocarbon groups described above (so long as the anionic moiety and cationic moiety maintain their anionic and cationic charges, respectively). Examples of suitable functional groups that may be included in the linking moiety, the lipophilic tail(s), and/or the R-groups ($R^1$, $R^2$, $R^3$) may include any one or more of: an ester, ether, amine, sulfonamide, amide, ketone, carbonyl, isocyanate, urea, urethane, and any combination thereof, for example. In certain embodiments, at least one of R, $R_1$, $R_2$, $R_3$, and $R_4$ may include a heteroatom (e.g., O, N, P, S, or another atom other than C or H).

In certain embodiments, the ionic liquid of the corrosion inhibitor additive is formed from one or more reaction products. In some embodiments, the reaction product results from direct protonation of a Brønsted base by a Brønsted acid. In some embodiments, the desired organic cation of the ionic liquid of the corrosion inhibitor additive is an electron pair donor and the desired organic anion of the ionic liquid of the corrosion inhibitor additive is an electron pair acceptor. In such an embodiment, the pH of the of the reaction product may be adjusted by adding non-equal amounts of the Brønsted base and Brønsted acid. For example, in certain embodiments, 2-[2-(dimethylamino)ethoxy]ethanol is reacted with 2-phosphonobutane-1,2,4-tricarboxylic acid to yield an ammonium phosphonate ionic liquid, as illustrated in Reaction I shown below. It will be appreciated by one of ordinary skill in the art having the benefit of the present disclosure that various modifications may be made to this reaction scheme to produce other ionic liquids.

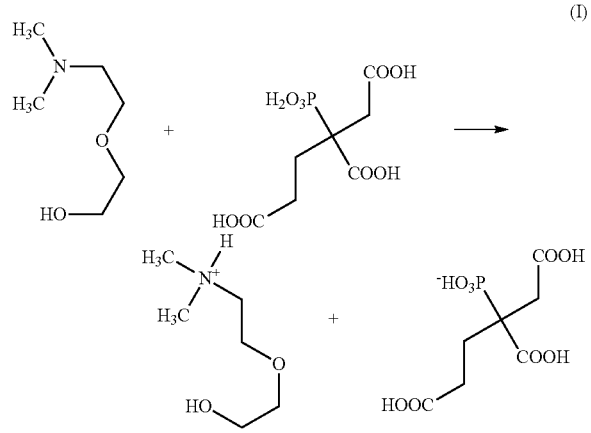

In certain embodiments, the ionic liquid of the corrosion inhibitor additive is formed from a reaction including a carbonate and/or a methyl carbonate salt of a desired organic cation of the ionic liquid. In such an embodiment, volatile byproducts such as carbon dioxide, methanol, and/or water may be evaporated under heat and/or a vacuum, leaving behind the ionic liquid. In some embodiments, direct protonation of the carbonate salt of the desired organic cation of the ionic liquid by an acid of the desired organic anion of the ionic liquid, followed by dismutation of the carbonic acid, yields carbon dioxide and water. In such an embodiment, the carbon dioxide and water are removed using heat and/or a vacuum, leaving behind the ionic liquid. For example, in certain embodiments, an ammonium carbonate is reacted with an alkylsulfonic acid producing an ammonium sulfonate ionic liquid, water, and carbon dioxide, as illustrated in Reaction II shown below.

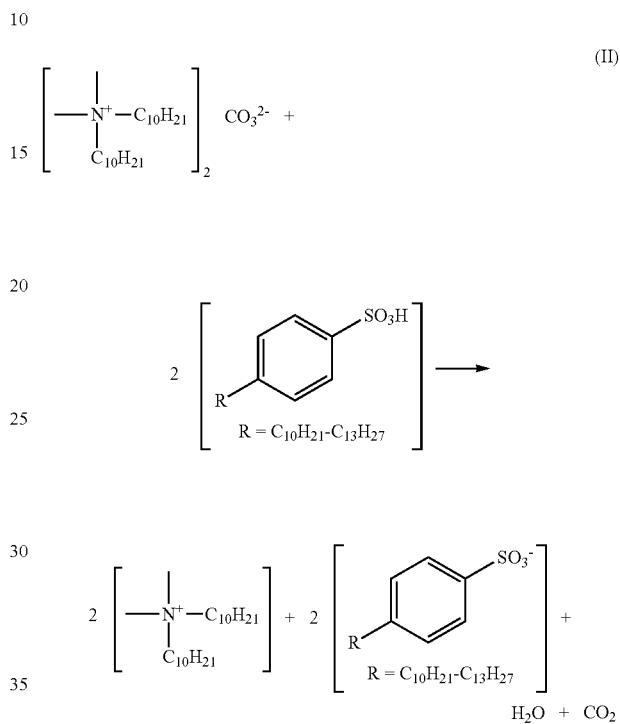

In other embodiments, protonation of the methyl carbonate salt of the desired organic cation of the ionic liquid by an acid of the desired organic anion of the ionic liquid followed by dismutation of the carbonic acid yields an ionic liquid, carbon dioxide and methanol. In such an embodiment, thecarbon dioxide and methanol may be removed using heat and/or a vacuum, leaving behind the ionic liquid. It will be appreciated by one of ordinary skill in the art having the benefit of the present disclosure that various modifications may be made to this reaction scheme to produce other ionic liquids.

In certain embodiments, the ionic liquid of the corrosion inhibitor additive is formed via acid driven anion exchange. In such an embodiment, if the desired organic anion of the ionic liquid is the conjugate base of a strong acid, the ionic liquid can be formed by the addition of the strong acid to a chloride salt that includes the desired organic cation of the ionic liquid. Protonation of the chloride salt yields hydrochloric acid, which may be removed using a vacuum to leave behind the ionic liquid. For example, in some embodiments, an ammonium chloride is reacted with a sulfonic acid to yield an ammonium sulfonate ionic liquid and hydrochloric acid, as illustrated in Reaction III shown below. It will be appreciated by one of ordinary skill in the art having the benefit of the present disclosure that various modifications may be made to this reaction scheme to produce other ionic liquids.

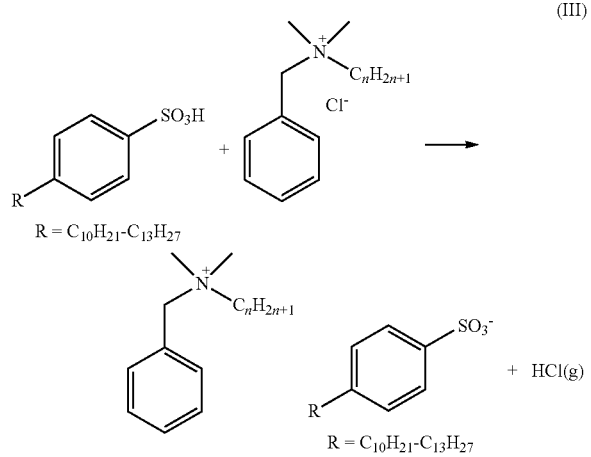

In certain embodiments, the ionic liquid of the corrosion inhibitor additive is formed via a double displacement reaction. In some embodiments, the organic cation of the ionic liquid corrosion inhibitor additive may be a reaction product of an alkylation using an alkyl halide or an alkyl sulfate. In certain embodiments, the desired organic cation and desired organic anion pair of the ionic liquid may be formed by selective precipitation of an undesired ion pair from solution. For example, the ionic liquid of the corrosion inhibitor may be formed by reacting a halide salt of the desired organic cation of the ionic liquid with a silver salt of the desired organic anion of the ionic liquid in an aqueous solution. Precipitation of the silver halide yields the ionic liquid in aqueous solution, as illustrated in Reaction IV shown below:

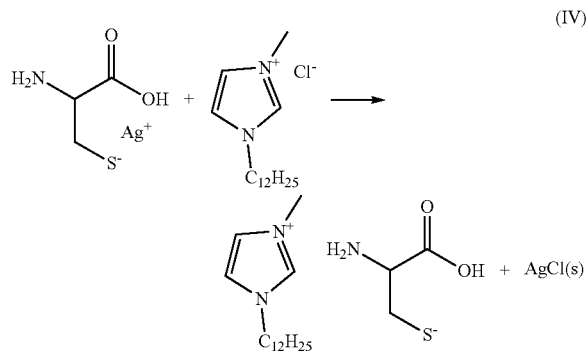

In another example embodiment, the ionic liquid of the corrosion inhibitor additive is formed by reacting a sulfate salt of the desired organic cation of the ionic liquid with a barium salt of the desired organic anion of the ionic liquid in aqueous solution, Precipitation of the barium sulfate yields the ionic liquid in aqueous solution. It will be appreciated by one of ordinary skill in the art having the benefit of the present disclosure that various modifications may be made to this reaction scheme to produce other ionic liquids.

In certain embodiments, the corrosion inhibitor additives may be provided, used, and/or introduced as an ionic liquid including an organic cation and an organic anion. In certain embodiments, such ionic liquids may wholly or partially dissociate in aqueous solution. In other embodiments, the ionic liquid may remain substantially associated (either with the organic cation and/or organic anion or with other ions from solution).

In certain embodiments, the corrosion inhibitor additive may be added to a fluid that comes into contact with a metal surface, including but not limited to treatment fluids used in conjunction with certain subterranean operations and/or fluids produced from a subterranean formation. In certain embodiments, one or more corrosion inhibitor additives may be introduced into a wellhead, a wellbore, a subterranean formation, a conduit, a vessel, and the like and may contact and/or be exposed to a metal surface residing therein. The corrosion inhibiting additives may be introduced in a subterranean formation and/or wellbore in conjunction with one or more treatment fluids. As used herein, the term "treatment fluid" refers to any fluid that may be used in an application in conjunction with a desired function and/or for a desired purpose. The term "treatment" does not imply any particular action by the fluid or any component thereof. Treatment fluids that may be useful in accordance with the present disclosure include, but are not limited to, fracturing fluids, gravel packing fluids, pre-pad fluids, pad fluids, preflush fluids, afterflush fluids, acidic fluids, consolidation fluids, cementing fluids, wellbore clean-out fluids, conformance fluids, aqueous fluids (e.g., fresh water, salt water, brines, etc.), non-aqueous fluids (e.g., mineral oils, synthetic oils, esters, etc.), hydrocarbon-based fluids (e.g., kerosene, xylene, toluene, diesel, oils, etc.), foamed fluids (e.g., a liquid that includes a gas), gels, emulsions, gases, and the like. In one or more embodiments, the treatment fluid may have a pH within a range of from about 3 to about 8. In one or more embodiments, the treatment fluid may have a pH within a range of from about 5 to about 10. In other embodiments, the treatment fluid including the corrosion inhibitor additive may have a pH greater than 4, 5, 6, 7, 8, or 9.

The methods and compositions of the present disclosure may be used during or in conjunction with any subterranean operation. Suitable subterranean operations may include, but are not limited to, preflush treatments, afterflush treatments, drilling operations, hydraulic fracturing treatments, sand control treatments (e.g., gravel packing), acidizing treatments (e.g., matrix acidizing or fracture acidizing), "frac-pack" treatments, well bore clean-out treatments, and other operations where a treatment fluid and/or corrosion inhibitor additive may be useful. In certain embodiments, the corrosion inhibitor additives may be used in near wellbore clean-out operations, wherein a treatment fluid may be circulated in the subterranean formation, thereby suspending or solubilizing particulates residing in the formation. The treatment fluid then may be recovered out of the formation, carrying the suspended or solubilized particulates with it. In certain embodiments, the methods and/or compositions of the present disclosure may be used in construction and/or operation of pipelines (e.g., transportation pipelines, distribution pipelines, etc.) or umbilical equipment that may be used, among other purposes, to transport various fluids (e.g., treatment fluids and/or fluids produced from subterranean formations).

In certain embodiments, the fluid that includes the corrosion inhibitor additive may be flowing or it may be substantially stationary. In certain embodiments, the fluid may be within a vessel, within a conduit (e.g., a conduit that may transport the fluid), within a subterranean formation, within a wellbore penetrating a portion of the subterranean formation, and/or within a wellhead of a wellbore. Examples of conduits suitable for certain embodiments include, but are not limited to pipelines, production piping, subsea tubulars, process equipment, and the like as used in industrial settings and/or as used in the production of oil and/or gas from a subterranean formation, and the like. In particular embodiments, the conduit may be a wellhead, a wellbore, or may be located within a wellbore penetrating at least a portion of a subterranean formation. Such oil and/or gas well may, for example, be a subsea well (e.g., with the subterranean formation being located below the sea floor), or it may be a sur lace well (e.g., with the subterranean formation being located belowground). A vessel or conduit according to other embodiments may be located in an industrial setting such as a refinery (e.g., separation vessels, dehydration units, pipelines, heat exchangers, and the like), or may be a transportation pipeline.

In some embodiments, the corrosion inhibitor additive may be incorporated into a fluid. For example, in some embodiments, the corrosion inhibitor additive may be added to a treatment fluid for use in, a wellbore penetrating a subterranean formation during, for instance, oil and/or gas recovery operations or other operations in connection with subterranean activities. The fluid may include a solvent for the corrosion inhibitor additive. Solvents suitable for certain embodiments of the present disclosure include, but are not limited to methanol, isopropyl alcohol, glycol, ethylene glycol, toluene, xylene, monobutyl ether, hexane, cyclohexane, and any combination or derivative thereof, for example. In some embodiments, the solvent may be an alcohol, an organic solvent, and/or any combination thereof. In certain embodiments, the corrosion inhibitor additives may be used with substantially no solvent, e.g., in an absence of a significant amount of solvent. In certain embodiments, the fluid also may include a rheology modifier which may modify the rheology of the corrosion inhibitor additives, for example, to adjust the viscosity of the corrosion inhibitor additives, to adjust the freezing point of the corrosion inhibitor additives, to facilitate handling of the corrosion inhibitor additives, to facilitate transport of the corrosion inhibitor additives, to facilitate pumping of the corrosion inhibitor additives, to facilitate precise dosing of the corrosion inhibitor additives, and/or to control the application rate of the corrosion inhibitor additives, and the like. In some embodiments, the rheology modifier may include low viscosity liquids that, are miscible or dispersible in a particular corrosion inhibitor additive including the ionic liquids of the present disclosure. Rheology modifiers suitable for certain embodiments of the present disclosure include, but are note limited to $C_1$ to $C_{10}$ alcohols (e.g., methanol, ethanol, isopropyl alcohol, butanol, 2-ethoxyethanol, ethylene glycol, propylene glycol), acetates such as carboxylate esters (e.g., methyl acetate, ethyl acetate, isopropyl acetate, 2-ethythexyl acetate), and ketones such as alkyl aldehyde (e.g., acetone, methyl ethyl ketone, dimethylformamide). In one or more embodiments, the theology modifier may be introduced and/or present in the fluid in a fluid in an amount within a range of from about 10% to 90% based on the weight of the fluid. In various embodiments, an effective amount of rheology modifier may be as low as any of: 10%, 20%, 30%, 40%, 50%, 60%, 70%, and 80% based on the weight of the fluid. In certain embodiments, an effective amount of rheology modifier in a fluid may be as high as any of: 20%, 30%, 40%, 50%, 60%, 70%, 80%, and 90% based on the weight of the fluid. Thus, in one or more embodiments, an effective amount of rheology modifier may be within a range of from about 30% to about 70% based on the weight of the fluid; from about 35% to about 65% based on the weight of the fluid; from about 40% to about 60% based on the weight of the fluid; from about 45% to about 55% based on the weight of the fluid; or from about 50% to about 60% based on the weight of the fluid. It will further be appreciated by one of ordinary skill in the art having the benefit of the present disclosure that the amount of the rheology modifier effective for modifying the rheology of the corrosion inhibitor additive may depend upon, for example, the temperature, pressure, fluid composition, additional additives in the fluid, and other conditions affecting the fluid and/or fluid environment.

In one or more embodiments, one or more corrosion inhibitor additives may be introduced into and/or present in a fluid in an amount within a range of from about 1 ppm to about 5,000 ppm based on the volume of the fluid. In various embodiments, an effective amount of one or more corrosion inhibitor additives for inhibiting, retarding, mitigating, reducing, controlling, and/or delaying corrosion may be as low as any of: 1, 500, 750, 1000, 1250, 1500, 1750, 2000, 2250, 2500, 2750, 3000, 3250, 3500, 3750, 4000, 4250, 4500, and 4,750 ppm based on the volume of the fluid. In certain embodiments, an effective amount of corrosion inhibitor additives in a fluid may be as high as any of: 500, 750, 1000, 1250, 1500, 1750, 2000, 2250, 2500, 2750, 3000, 3250, 3500, 3750, 4000, 4250, 4500, 4750, and 5000 ppm based on the volume of the fluid. Thus, in one or more embodiments, an effective amount of corrosion inhibitor additives for inhibiting, retarding, mitigating, reducing, controlling, and/or delaying corrosion may be within a range of from about 100 to about 4000 ppm based on the volume of the fluid; from about 250 to about 3500 ppm by volume based on the volume of the fluid; from about 2 to about 2400 ppm by volume based on the volume of the fluid; from about 3 to about 1900 ppm by volume based on the volume of the fluid; from about 4 to about 500 ppm by volume based on the volume of the fluid; or from about 5 to about 15 ppm by volume based on the volume of the fluid. It further will be appreciated by one of ordinary skill in the art having the benefit of the present disclosure that the amount of the corrosion inhibitor additives effective for inhibiting, retarding, reducing, controlling, and/or delaying corrosion may depend upon, for example, the temperature, pressure, fluid composition, other additives in the fluid, and other conditions.

In certain embodiments, the fluid to which one or more corrosion inhibitor additives may be introduced optionally may include any number of additives. Examples of such additives include, but are not limited to salts, surfactants, acids, proppant particulates, diverting agents, fluid loss control additives, nitrogen, carbon dioxide, surface modifying agents, tackifying agents, foamers, additional corrosion inhibitors, corrosion inhibitor intensifiers, scale inhibitors, hydrate inhibitors, catalysts, clay control agents, biocides, friction reducers, antifoam agents, bridging agents, flocculants, $H_2S$ scavengers, $CO_2$ scavengers, oxygen scavengers, lubricants, viscosifiers, breakers, weighting agents, relative permeability modifiers, resins, wetting agents, coating enhancement agents, filter cake removal agents, antifreeze agents (e.g., ethylene glycol), and the like. A person skilled in the art, with the benefit of this disclosure, will recognize the types of additives that may be included in the fluids for a particular application.

In certain embodiments, the corrosion inhibitor additives may be introduced into a wellhead of a wellbore penetrating at least a portion of the subterranean formation, a wellbore, subterranean formation, a vessel, and/or a conduit (and/or into a fluid within any of the foregoing) using any method or equipment known in the art. In certain embodiments, the corrosion inhibitor additives are introduced in to a wellbore penetrating at least a portion of a subterranean formation through which a fluid is flowing. For example, the corrosion inhibitor additives may be applied to a subterranean formation and/or wellbore using batch treatments, squeeze treatments, continuous treatments (e.g., during gas lift powered extraction), and/or any combination thereof. In certain embodiments, a batch treatment may be performed in a subterranean formation by stopping production from the well and pumping the fluid including the corrosion inhibitor additives into a wellbore, which may be performed at one or more points in time during the life of a well. In other embodiments, a squeeze treatment may be performed by squeezing the corrosion inhibitor additives (and optional rheology modifier mixed therewith) downhole into the formation, allowing production out of the formation to bring the corrosion inhibitor additives to their desired location. In other embodiments, a gas lift extraction may be performed in a subterranean formation by mixing the corrosion inhibitor additives with a pressurized gas, which is subsequently injected into a wellbore, allowing the production out of the formation to bring the corrosion inhibitor additives to their desired location.

In other embodiments, a corrosion inhibitor additive may be injected into a portion of a subterranean formation using an annular space or capillary injection system to continuously introduce the corrosion inhibitor additive into the formation. In certain embodiments, a composition (such as a treatment fluid) including a corrosion inhibitor additive may be circulated in the wellbore using the same types of pumping systems and equipment at the surface that are used to introduce treatment fluids or other additives into a wellbore penetrating at least a portion of the subterranean formation. In certain embodiments, the corrosion inhibitor additive may be introduced to a fluid through a conduit or an injection point in fluid communication with a wellbore in which the fluid resides. In certain embodiments, the fluid is introduced through a conduit through which the fluid is flowing.

For example, a corrosion inhibitor additive may be introduced into a wellbore and/or tubing using a capillary injection system as shown in FIG. 1. Referring now to FIG. 1, wellbore 105 has been drilled to penetrate a portion of a subterranean formation 100. A tubing 110 (e.g., production tubing) has been placed in the wellbore 105. A capillary injection tube 130 is disposed in the annular space between the outer surface of tubing 110 and the inner wall of wellbore 105. The capillary injection tube 130 is connected to a side-pocket mandrel 140 at a lower section of the tubing 110. A corrosion inhibitor additive may be injected into capillary injection tube 130 at the wellhead 108 at the surface such that it mixes with production fluid at or near the side-pocket mandrel 140. As the production fluid flows through the tubing 110, the corrosion inhibitor additive may prevent, inhibit, retard, reduce, control, and/or delay corrosion within the tubing 110. Other capillary injection systems and side pocket mandrel devices (e.g., those used in gas lift production) may be used in a similar manner to the system shown in FIG. 1.

In certain embodiments, a corrosion inhibitor additive may be added to a conduit such as a pipeline where one or more fluids enter the conduit and/or at one or more other locations along the length of the conduit. In such embodiments, the corrosion inhibitor additive may be added in batches or injected substantially continuously while the pipeline is being used, for example, to maintain the concentration of the corrosion inhibitor additive in the fluid at a certain amount (e.g., one or more of the concentrations referenced above). Once introduced into a fluid, subterranean formation, wellbore, pipeline, vessel, or other location, the corrosion inhibitor additive may inhibit, retard, reduce, control, and/or delay corrosion within the fluid, subterranean formation, wellbore, pipeline, vessel, or other location.

An embodiment of the present disclosure is a method that includes contacting a metal surface with a fluid that includes a corrosion inhibitor additive, wherein the corrosion inhibitor additive includes an ionic liquid; wherein the ionic liquid includes an organic cation and an organic anion; and wherein the corrosion inhibitor additive at least partially inhibits corrosion of the metal surface. In one or more of the embodiments above, the organic anion at least partially inhibits corrosion of the metal surface. In one or more of the embodiments above, the organic cation includes one or more cationic moieties selected from the group consisting of an ammonium cation, an imidazolium cation, a pyrrolidinium cation, a morpholinium cation, a pyridinium cation, a pyrazolium cation, a triazolium cation, a sulfonium cation, a phosphonium cation, and any combination thereof. In one or more of the embodiments above, the organic anion includes one or more anionic moieties selected from the group consisting of a sulfonate anion, a carboxylate anion, a phosphonate anion, a thiolate anion, and any combination thereof. In one or more of the embodiments above, the method further includes the step of introducing the corrosion inhibitor additive to the fluid. In one or more of the embodiments above, the corrosion inhibitor additive is present in an amount from about 1 parts per million ("ppm") to about 5,000 ppm based on the volume of the fluid. In one or more of the embodiments above, the fluid further includes a rheology modifier. In one or more of the embodiments above, the metal surface includes a metal selected from the group consisting of a ferrous alloy, a carbon steel, any derivative thereof and any combination thereof. In one or more of the embodiments above, the ionic liquid is a reaction product of a reaction between (i) a carbonate salt of the organic cation and (ii) an acid of the organic anion; wherein the water and carbon dioxide are evaporated to leave behind the ionic liquid. In one or more of the embodiments above, the ionic liquid is a reaction product of a reaction between (i) a methyl carbonate salt of the organic cation and (ii) an acid of the organic anion; wherein the methanol and carbon dioxide are evaporated to leave behind the ionic liquid.

Another embodiment of the present disclosure is a method that includes introducing a corrosion inhibitor additive into a wellbore penetrating at least a portion of a subterranean formation, wherein the corrosion inhibitor additive includes an ionic liquid; wherein the ionic liquid includes an organic cation and an organic anion; and contacting a metal surface in the wellbore with the corrosion inhibitor additive; wherein the corrosion inhibitor additive at least partially inhibits corrosion of the metal surface. In one or more of the embodiments above, the organic anion at least partially inhibits corrosion of the metal surface. In one or more of the embodiments above, the corrosion inhibitor additive is introduced into the wellbore through a conduit or an injection point in fluid communication with the wellbore. In one or more of the embodiments above, the organic cation includes one or more one or more cationic moieties selected from the group consisting of an ammonium cation, an imidazolium cation, a pyrrolidinium cation, a morpholinium cation, a pyridinium cation, a pyrazolium cation, a triazolium cation, a sulfonium cation, a phosphonium cation, and any combination thereof. In one or more of the embodiments above, the organic anion includes one or more anionic moieties selected from the group consisting of a sulfonate anion, a carboxylate anion, a phosphonate anion, a thiolate anion, and any combination thereof. In one or more of the embodiments above, the corrosion inhibitor additive is introduced into the wellbore by mixing the corrosion inhibitor additive with a pressurized gas. In one or more of the embodiments above, the metal surface includes a metal selected from the group consisting of a ferrous alloy, a carbon steel, any derivative thereof and any combination thereof. In one or more of the embodiments above, the method further includes allowing the corrosion inhibitor additive to contact a fluid residing in the wellbore or subterranean formation.

Another embodiment of the present disclosure is a method that includes introducing a fluid that includes a corrosion inhibitor additive into at least a portion of a conduit or container that includes a metal surface, wherein the corrosion inhibitor additive includes an ionic liquid; wherein the ionic liquid includes an organic cation and an organic anion; and contacting the metal surface with the corrosion inhibitor additive, corrosion inhibitor additive at least partially inhibits corrosion of the metal surface, in one or more of the embodiments above, the organic anion at least partially inhibits corrosion of the metal surface. In one or more of the embodiments above, the organic cation includes one or more cationic moieties selected from the group consisting of an ammonium cation, an imidazolium cation, a pyrrolidinium cation, a morpholinium cation, a pyridinium cation, a pyrazolium cation, a triazolium cation, a sulfonium cation, a phosphonium cation, and any combination thereof. In one or more of the embodiments above, the organic anion includes one or more anionic moieties selected from the group consisting of a sulfonate anion, a carboxylate anion, a phosphonate anion, a thiolate anion, and any combination thereof. In one or more of the embodiments above, the fluid is introduced into the portion of the conduit or container by mixing the fluid with a pressurized gas.

To facilitate a better understanding of the present disclosure, the following examples of certain aspects of certain embodiments are given. The following examples are not the only examples that could be given according to the present disclosure and are not intended to limit the scope of the disclosure or claims.

Example 1

Figure 2:
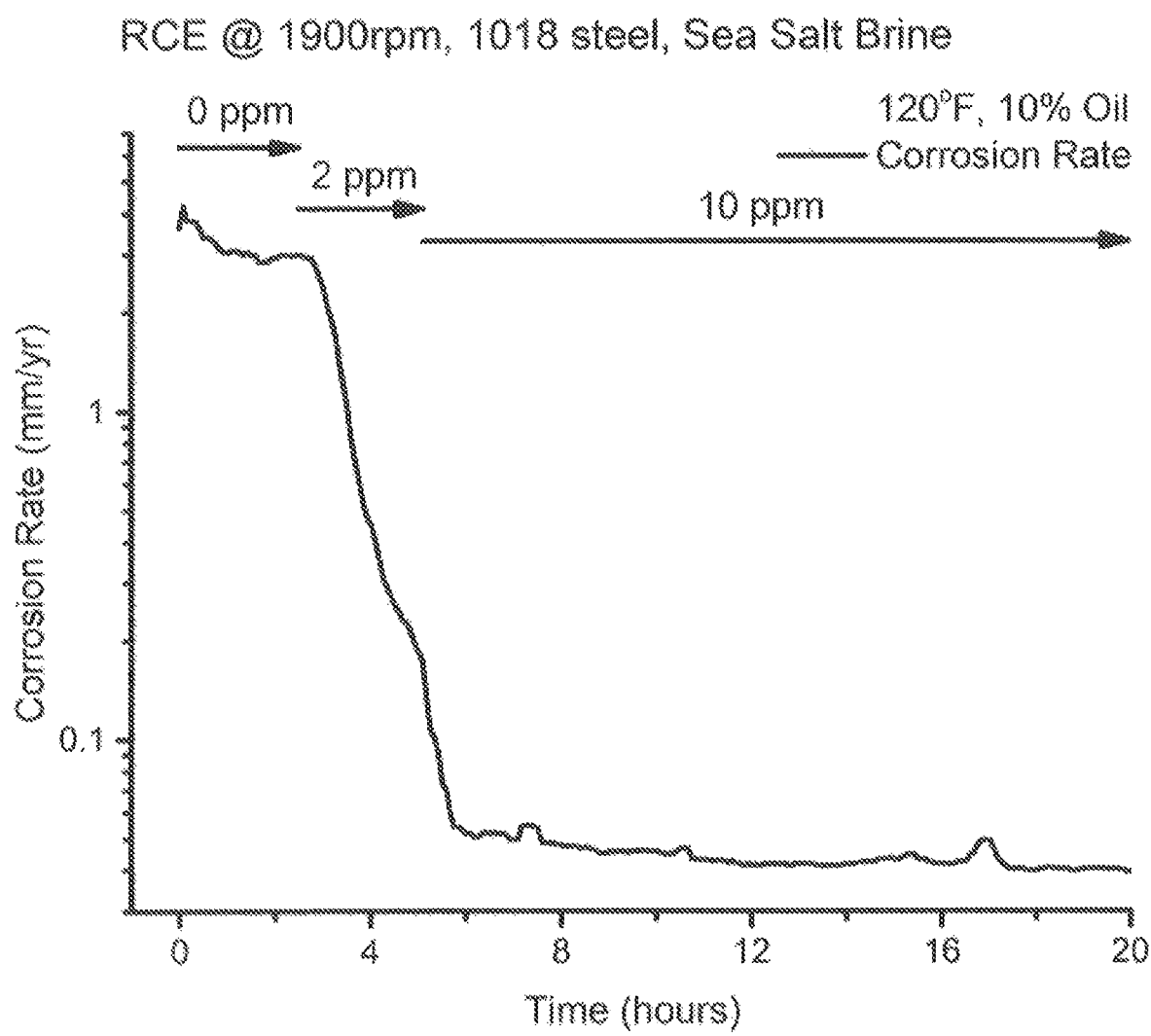
FIG. 2 is a graph illustrating data relating to corrosion rates using the corrosion inhibitor additives of the present disclosure at various concentrations.

The effectiveness of an example corrosion inhibitor additive of the present disclosure was evaluated using a linear polarization resistance technique and a Gamry electrochemical measurement system. A corrosion inhibitor additive including alkyldimethylbenzylammonium sulfonate was formulated in two concentrations (2 ppm and 10 ppm) to test solutions that each included 90% synthetic sea-salt brine and 10% LVT-200 light, petroleum distillate (available from various suppliers) by volume. The test solutions were heated to 120° F., continuously purged with $CO_2$, and stirred with a magnetic stir bar/plate combination. The corrosion inhibitor additives were added after approximately 4 hours. The working electrode (1018 carbon steel) was polarized +/−13 mV from its free corroding potential at a scan rate of 0.4 mV/second. The pseudo-reference electrode and counter electrode were 316SS rods. The corrosion rate on the working electrode was measured using the linear polarization resistance technique, and those measurements are shown in FIG. 2. The average uninhibited corrosion rate was 3 millimeters per year ("min/yr") prior to injecting 2 ppm of the corrosion inhibitor additive. As shown in FIG. 2, the corrosion rate decreased to about 0.05 mm/yr about 6 hours after adding the corrosion inhibitor additive at 2 ppm. Accordingly, the corrosion inhibitor additive at 2 ppm provided 98.3% inhibition. When the dose rate, was increased to 10 ppm of the corrosion inhibitor additive, the corrosion rate decreased to about 0.04 mm/yr after about 12 hours, a corrosion inhibition efficiency of 98.6%. These data demonstrate that the corrosion inhibitor additives of the present disclosure effectively inhibit corrosion at various concentrations.

Example 2

Figure 3:
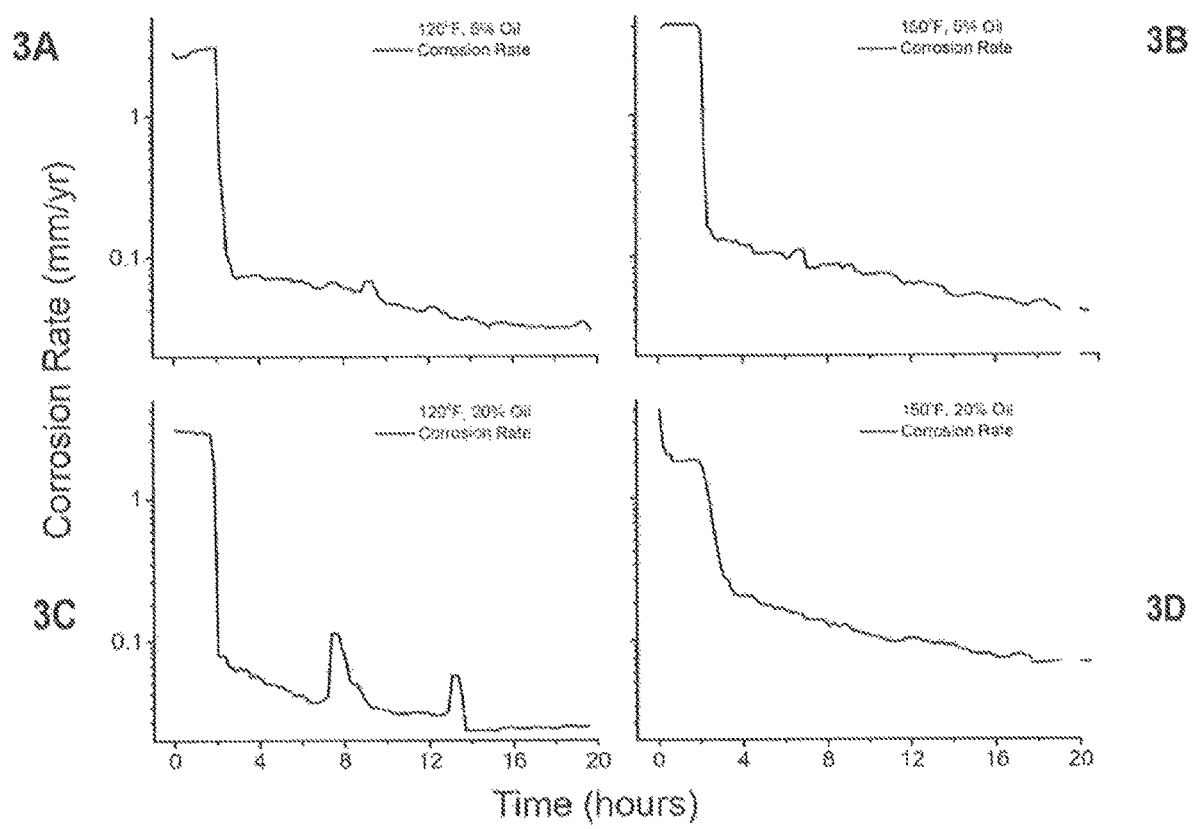
FIGS. 3A, 3B, 3C, and 3D are graphs illustrating data relating to corrosion rates using the corrosion inhibitor additives of the present disclosure at various temperatures and/or oil/water fractions.

As in Example 1, the effectiveness of an example corrosion inhibitor additive of the present disclosure was evaluated using a linear polarization resistance technique and a Gantry electrochemical measurement system. A corrosion inhibitor additive including alkyldimethylbenzylammonium was formulated at two temperatures (120° F. and 150° F.) to test solutions that each included 95% synthetic sea-salt brine and 5% LVT-200 light petroleum distillate (available from various suppliers) by volume. The test solutions were heated to 120° F. and 150° F. respectively, continuously purged with $CO_2$, and stirred with a magnetic stir bar/plate combination. The corrosion inhibitor additives were added after approximately 2 hours. The working electrode (1018 carbon steel) was polarized +/−13 mV from its free corroding potential at a scan rate of 0.4 mV/second. The pseudo-reference electrode and counter electrode were 316SS rods. The corrosion rate on the working electrode was measured using the linear polarization resistance technique, and those measurements are shown in FIG. 3. The average uninhibited corrosion rate was 3 mm/yr for the 120° F. test solution (FIG. 3A) and 4.4 mm/yr for the 150° F. test solution (FIG. 3B) prior to injecting 7.5 ppm of the corrosion inhibitor additive. The corrosion rate decreased to about 0.03 mm/yr for the 120° F. test solution (FIG. 3A) and about 0.05 mm/yr for the 150° F. test solution (FIG. 3B) about 10 hours after adding the corrosion inhibitor additive at 7.5 ppm. Accordingly, the corrosion inhibitor additive provided 99% inhibition at 120° F. and 98.8% inhibition at 150° F. Similar temperature data is provided in FIGS. 3C and 3D for test solutions that each included 80% synthetic sea-salt brine and 20% LVT-200 light petroleum distillate (available from various suppliers) by volume. These data demonstrate that the corrosion inhibitor additives of the present disclosure effectively inhibit corrosion at various temperatures.

Example 3

As in Examples 1-2, the effectiveness of an example corrosion inhibitor additive of the present disclosure was evaluated using a linear polarization resistance technique and a Gamry electrochemical measurement system. A corrosion inhibitor additive including alkyldimethylbenzylammonium sulfonate was formulated in two test solutions containing the following oil/water fractions respectively: (i) a first test solution containing 95% synthetic sea-salt brine and 5% LVT-200 light petroleum distillate (available from various suppliers) by volume and (ii) a second test solution 80% synthetic sea-salt brine and 20% LVT-200 light petroleum distillate (available from various suppliers) by volume. The test solutions were heated to 120° F., continuously purged with $CO_2$, and stirred with a magnetic stir bar/plate combination. The corrosion inhibitor additives were added after approximately 2 hours. The working electrode (1018 carbon steel) was polarized +/−13 mV from its free corroding potential at a scan rate of 0.4 mV/second. The pseudo-reference electrode and counter electrode were 316SS rods. The corrosion rate on the working electrode was measured using the linear polarization resistance technique, and those measurements are shown in FIG. 3. The average uninhibited corrosion rate was 3 mm/yr for the first test solution (FIG. 3A) and 3 mm/yr for the second test solution (FIG. 3C) prior to injecting 7.5 ppm of the corrosion inhibitor additive. The corrosion rate decreased to about 0.03 mm/yr for the first test solution (FIG. 3A) and about 0.02 mm/yr for the second test solution (FIG. 3C) about 10 hours alley adding the corrosion inhibitor additive at 7.5 ppm. Accordingly, the corrosion inhibitor additive provided 99% inhibition for the first test solution and 99.3% inhibition for the second test solution. Similar data is provided in FIGS. 3B and 3D for test solutions with the same oil/water fractions at a temperature of 150'F. These data demonstrate that die corrosion inhibitor additives of the present disclosure effectively inhibit corrosion at various oil water fractions.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be, made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
    contacting a metal surface with a fluid comprising a corrosion inhibitor additive by injecting the corrosion inhibitor additive using a capillary injection system, wherein the capillary injection system comprises a capillary injection tube connected to a side-pocket mandrel at a lower section of a production tubing;
    wherein the corrosion inhibitor additive comprises an ionic liquid;
    wherein the ionic liquid comprises an organic cation and an organic anion, wherein the organic anion comprises two anionic moieties, a carboxylate anionic moiety and a phosphonate anionic moiety, wherein the organic cation comprises an ammonium cationic moiety, wherein the ionic liquid has a stoichiometric ratio of anionic moieties to cationic moieties from 1:1 to 1:2;
    wherein the two anionic moieties and the ammonium cationic moiety each comprises R1, R2, R3, and R4, wherein each of R1, R2, R3, and R4 comprises a hydrocarbon chain;
    wherein the two anionic moieties are bonded via a linking moiety comprising a C1 to C20 hydrocarbon chain;
    wherein at least one of R1, R2, R3, R4, and the linking moiety comprises a heteroatom; and
    wherein the corrosion inhibitor additive at least partially inhibits corrosion of the metal surface.

2. The method of claim 1, wherein the organic cation further comprises one or more cationic moieties selected from the group consisting of an imidazolium cation, a pyrrolidinium cation, a morpholinium cation, a pyridinium cation, a pyrazolium cation, a triazolium cation, a sulfonium cation, a phosphonium cation, and any combination thereof.

3. The method of claim 1, wherein the organic anion further comprises one or more anionic moieties selected from the group consisting of a sulfonate anion, a thiolate anion, and any combination thereof.

4. The method of claim 1, further comprising the step of introducing the corrosion inhibitor additive to the fluid.

5. The method of claim 1, wherein the corrosion inhibitor additive is present in an amount from about 1 parts per million ("ppm") to about 5,000 ppm based on the volume of the fluid.

6. The method of claim 1, wherein the fluid further comprises a rheology modifier.

7. The method of claim 1, wherein the metal surface comprises a metal selected from the group consisting of a ferrous alloy, a carbon steel, any derivative thereof, and any combination thereof.

8. The method of claim 1, wherein the ionic liquid is a reaction product of a reaction between (i) a carbonate salt of the organic cation and (ii) an acid of the organic anion; wherein water and carbon dioxide are evaporated to leave behind the ionic liquid.

9. The method of claim 1, wherein the ionic liquid is a reaction product of a reaction between (i) a methyl carbonate salt of the organic cation and (ii) an acid of the organic anion; wherein methanol and carbon dioxide are evaporated to leave behind the ionic liquid.

10. A method comprising:
    introducing a corrosion inhibitor additive into a wellbore penetrating at least a portion of a subterranean formation by injecting the corrosion inhibitor additive using a capillary injection system, wherein the capillary injection system comprises a capillary injection tube connected to a side-pocket mandrel at a lower section of a production tubing,
    wherein the corrosion inhibitor additive comprises an ionic liquid;
    wherein the ionic liquid comprises an organic cation and an organic anion, wherein the organic anion comprises two anionic moieties, a carboxylate anionic moiety and a phosphonate anionic moiety, wherein the organic cation comprises an ammonium cationic moiety, wherein the ionic liquid has a stoichiometric ratio of anionic moieties to cationic moieties from 1:1 to 1:2;
    wherein the two anionic moieties and the ammonium cationic moiety each comprises R1, R2, R3, and R4, wherein each of R1, R2, R3, and R4 comprises a hydrocarbon chain;
    wherein the two anionic moieties are bonded via a linking moiety comprising a C1 to C20 hydrocarbon chain;
    wherein at least one of R1, R2, R3, R4, and the linking moiety comprises a heteroatom and
    contacting a metal surface in the wellbore with the corrosion inhibitor additive wherein the corrosion inhibitor additive at least partially inhibits corrosion of the metal surface.

11. The method of claim 10, wherein the organic cation further comprises one or more cationic moieties selected from the group consisting of an imidazolium cation, a pyrrolidinium cation, a morpholinium cation, a pyridinium cation, a pyrazolium cation, a triazolium cation, a sulfonium cation, a phosphonium cation, and any combination thereof.

12. The method of claim 10, wherein the organic anion further comprises one or more anionic moieties selected from the group consisting of a sulfonate anion, a thiolate anion, and any combination thereof.

13. The method of claim 10, wherein the metal surface comprises a metal selected from the group consisting of a ferrous alloy, a carbon steel, any derivative thereof, and any combination thereof.

14. The method of claim 10, further comprising allowing the corrosion inhibitor additive to contact a treatment fluid residing in the wellbore or subterranean formation.

15. A method comprising:

introducing a fluid comprising a corrosion inhibitor additive into at least a portion of a conduit or container comprising a metal surface by injecting the corrosion inhibitor additive using a capillary injection system, wherein the capillary injection system comprises a capillary injection tube connected to a side-pocket mandrel at a lower section of a production tubing, wherein the corrosion inhibitor additive comprises an ionic liquid; wherein the ionic liquid comprises an organic cation and an organic anion, wherein the organic anion comprises two anionic moieties, a carboxylate anionic moiety and a phosphonate anionic moiety, wherein the organic cation comprises an ammonium cationic moiety, wherein the ionic liquid has a stoichiometric ratio of anionic moieties to cationic moieties from 1:1 to 1:2;

wherein the two anionic moieties and the ammonium cationic moiety each comprises R1, R2, R3, and R4, wherein each of R1, R2, R3, and R4 comprises a hydrocarbon chain;

wherein the two anionic moieties are bonded via a linking moiety comprising a C1 to C20 hydrocarbon chain;

wherein at least one of R1, R2, R3, R4, and the linking moiety comprises a heteroatom; and contacting the metal surface with the corrosion inhibitor additive; wherein the corrosion inhibitor additive at least partially inhibits corrosion of the metal surface.

16. The method of claim 15, wherein the organic cation further comprises one or more cationic moieties selected from the group consisting of an imidazolium cation, a pyrrolidinium cation, a morpholinium cation, a pyridinium cation a pyrazolium cation, a triazolium cation, a sulfonium cation, a phosphonium cation, and any combination thereof.

17. The method of claim 15, wherein the organic anion further comprises one or more anionic moieties selected from the group consisting of a sulfonate anion, a thiolate anion, and any combination thereof.

\* \* \* \* \*